United States Patent [19]

Hunt et al.

[11] 3,797,035

[45] Mar. 12, 1974

[54] RECORDING MEDIA ORIENTATION

[75] Inventors: Ronald E. Hunt; Larry H. Robbins, both of Austin, Tex.

[73] Assignee: International Business Machines Corporation, Armonk, N.Y.

[22] Filed: June 23, 1971

[21] Appl. No.: 265,841

[52] U.S. Cl. .............................. 274/41.4, 274/39 R
[51] Int. Cl. ....................... G11b 23/14, G11b 25/04
[58] Field of Search ..................... 274/39 R, 41.4, 42

[56] References Cited

FOREIGN PATENTS OR APPLICATIONS 351,768 3/1961 Switzerland ....................... 274/41.4

*Primary Examiner*—Samuel B. Rothberg
*Assistant Examiner*—Charles E. Phillips
*Attorney, Agent, or Firm*—James H. Barksdale, Jr.

[57] ABSTRACT

A recording media having orientation means for defining a recording surface. The recording media is a flat circular disc rotatable about a central opening. The orientation means is adjacent the central opening and is made up of at least one opening. When only one opening is used, it must in general be asymmetrical with respect to any radius extending from the central opening. The central opening in the disc cooperates with a spindle on a recording apparatus turntable. Adjacent the spindle on the turntable is a cooperating orientation member which enters the orientation opening(s) only when the disc is properly positioned in the recording apparatus.

9 Claims, 3 Drawing Figures

RECORDING MEDIA ORIENTATION

BACKGROUND OF THE INVENTION

1. Field of the Invention

This invention relates to disc recording and transcribing apparatuses in general, and more specifically to a disc to be used in conjunction with such apparatuses which is provided with at least one opening for insuring proper orientation.

2. Description of the Prior Art

Representative of closest known prior art is U.S. Pat. No. 3,409,746, which discloses a circular recording media having an index means of substantial radial dimension. The index means is used for cueing purposes and not for orientation to determine a particular side of a disc. In fact, due to the structure of the index means successful cueing can be accomplished regardless of media orientation. With the embodiment disclosed, dictation could be lost if a disc having only one recording surface were inserted into the recording area in an upside-down position. Without an orientation means and cooperating orientation member arrangement as disclosed in this application, a check/read operation or means would be required to determine if the recording head is adjacent the recording surface on the disc.

Other patents developed during a search of the prior art include U.S. Pat. Nos. 2,565,035, 2,567,092, 2,886,330, 3,131,937, 3,229,269, and British patent 714,621.

SUMMARY OF THE INVENTION

The aforementioned problems are overcome by providing a rotatable recording media having a central opening with an orientation means for insuring proper positioning, and proper top and bottom orientation of the media in a recording apparatus. The orientation means is made up of at least one opening adjacent the central opening. The orientation means will cooperate with an appropriately shaped orientation member when properly oriented during positioning in the recording apparatus. In operation, the media is inserted into the recording area of the recording apparatus and a turntable carrying a spindle and orientation member is raised for causing registration of the spindle and central opening. As the media is rotated, the orientation opening in the media will pick up the cooperating orientation member on the turntable and rotate the turntable for phasing purposes. Phasing will occur only if the disc has been inserted with the right side up.

DESCRIPTION OF THE PREFERRED EMBODIMENT

Figure 1:
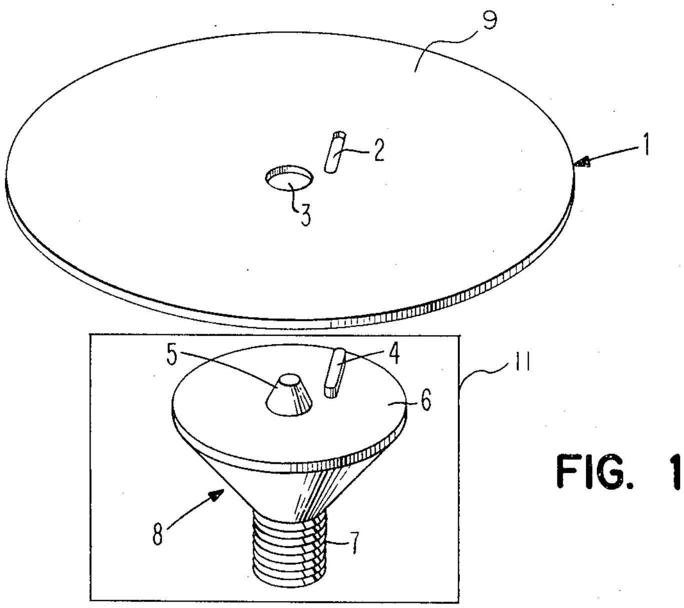
FIG. 1 is a perspective view showing a recording disc having a central opening and an orientation slot for cooperating with a turntable having a spindle and orientation member.

For a more detailed description of the invention reference is first made to FIG. 1 wherein there is shown a flat circular recording disc generally denoted by reference numeral 1 and a turntable mechanism generally denoted by reference numeral 8. Recording disc 1 has a recording surface 9, a central opening 3, and an orientation slot 2. Turntable mechanism 8 is made up of a worm gear portion 7, a bed portion 6, a raised orientation member 4 for entering the orientation slot 2 in disc 1, and a tapered spindle 5 for entering central opening 3 in disc 1 to center the disc.

When a recording operation is to begin, disc 1 is inserted into the recording area of a recorder represented by block 11 and turntable mechanism 8 is partially raised for causing registration of spindle 5 and opening 3. Disc 1 is then rotated in the reverse direction by means not shown until slot 2 picks up member 4. When this occurs, a positive angular relationship is established between disc 1 and turntable mechanism 8. Also, turntable mechanism 8 will rise a further extent as will be described below. Rotation in the reverse direction then continues until phasing of the disc has been completed. Phasing is determined by sensing means (not shown) associated with worm gear 7, but cannot occur unless slot 2 engages member 4. The disc, after phasing, is rotated in the forward direction by means not shown and turntable mechanism 8 is also turned.

Turntable mechanism 8, as described above, is partially raised for effecting engagement of spindle 5 and opening 3. A hub or other means (not shown) is used for maintaining disc 1 in the vertical direction. In this way, when slot 2 picks up member 4, turntable mechanism 8 is permitted to rise a further extent bringing bed portion 6 into flush contact with disc 1 which is in contact with the hub.

In addition to the structure shown in the drawing, the recording apparatus represented by block 11 is made up of a read/write head, drive means for rotating the disc, sensing means for determining phasing, and other well known devices such as microphones, speakers, etc.

Orientation as referred to herein is meant to include the defining of the top and bottom of a disc and not its angular position as related to spiral recording. Also, the term is not meant to include the relative horizontal position of the disc relative to a read/write head or turntable mechanism 8.

The recording media in the preferred embodiment is a disc made up of a sheet of polymeric material having a magnetic oxide coating on one side thereof. In the center of the disc is cut an opening about which the disc is rotated for spiral recording. Adjacent the central opening is cut or molded another slot lying on a radius, but being asymmetrical with respect thereto.

By making the orientation slot in the disc and the orientation member non-symetrical with respect to any radius, if the disc is inserted in an upside down position, the orientation slot in the disc will not match the orientation member on the turntable. This is of course not true, as discussed above, with respect to the radial slot system of U.S. Pat. No. 3,409,746. In the preferred configuration shown in FIG. 1, the orientation means is a single slot which is elongated and which is centered on a radius, but positioned at about a 45° angle to that radius.

Figure 2:
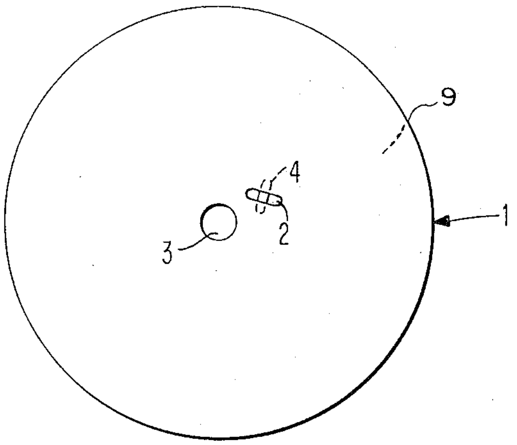
FIG. 2 is a plan view of a disc, which has been inserted into a recording apparatus in an upside down position, showing the central opening, the orientation slot, and the orientation member.

By providing rounded edges on the upper portion of orientation member 4, member 4 will slide past the slot 2 at approximately 90° (FIG. 2) if the disc is inserted in an upside down position. There will be little or no tendency for an edge of slot 2 to catch an edge of member 4 and cause damage to disc 1. Also, depending on the thickness of disc 1, the cooperating edges of slot 2 may be rounded to further insure against one edge catching another. If the disc is very thin, this may not be necessary, and/or economically feasible.

Figure 3:
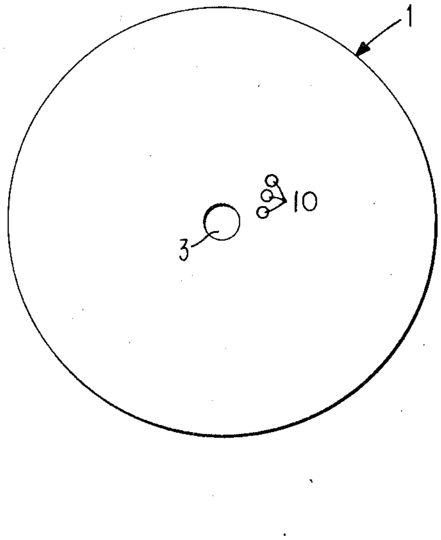
FIG. 3 is a plan view of another embodiment of a disc illustrating multiple openings which are offset with respect to a radius.

Referring to FIG. 3 there is shown another embodiment of disc 1 having orientation openings 10 which are positioned on an offset line from any radius. The number of openings 10 is immaterial, although the greater the number, the less the recording area on disc 1.

The foregoing discussion concerning the non-symmetry of the orientation means relative to any radius can be further appreciated from the following examples.

Referring to FIG. 3, each circular opening 10 taken alone is symmetrical with respect to a radius falling on a diameter of the opening. When any one radius is considered though, the combination of openings 10 is asymmetrical with respect thereto.

When single polygons are considered, the configuration and planar orientation must be taken into account. That is, a square can be symmetrical with respect to a radius if the radius intersects opposite corners or the mid-points of opposing sides. A rectangle will be symmetrical about a radius if the mid-points of opposing sides are intersected. Irregular shaped polygons and other figures asymmetrical in any respect present no problems in terms of planar orientation.

In summary, a flat circular recording disc having a recording surface on one side is provided with a central opening and at least one opening adjacent the central opening for insuring proper orientation of the disc for recording purposes. In operation, the media is inserted into the recording area of the recording apparatus and a turntable carrying a spindle and orientation member is raised for causing registration of the spindle and central opening. As the media is rotated, the orientation opening in the media will pick up the cooperating orientation member on the turn-table and rotate the turntable for phasing or cueing purposes, only if the right side of the media is properly oriented.

While the invention has been particularly shown and described with reference to several embodiments, it will be understood by those skilled in the art that various changes in form and detail may be made without departing from the spirit and scope of the invention.

What is claimed is:

1. A recording media comprising:

a. a member, rotatable during a recording operation in a recording apparatus, having top and bottom surfaces, one of which comprises a recording surface; and b. orientation means comprising a single opening which is asymmetrical with respect to any radius extending from an axis about which said rotatable member is rotatable, and associated with said recording surface for determining top and bottom orientation of said member with respect to said recording apparatus.

2. A recording media according to claim 1 wherein said orientation means is comprised of an elongated slot in said member.

3. A recording media according to claim 2 further including a central opening about which said member is rotatable.

4. In a magnetic recording apparatus in which reading and recording are accomplished, the combination comprising:

a. a member, rotatable during said reading and recording, having top and bottom surfaces, one of which comprises a recording surface;

b. orientation means comprising a single opening which is asymmetrical with respect to any radius extending from an axis about which said rotatable member is rotatable, and associated with said recording surface; and c. an orientation member for cooperating with said orientation means when said rotatable member is properly top and bottom oriented in said recording apparatus.

5. The combination according to claim 4 wherein said orientation means is comprised of an elongated slot in said rotatable member.

6. The combination according to claim 5 further including a central opening in said rotatable member about which said rotatable member is rotatable.

7. The combination according to claim 6 wherein said orientation member is positioned on a rotatable turntable mechanism.

8. The combination according to claim 7 wherein said turntable mechanism comprises a bed portion having a spindle for cooperating with said central opening.

9. A magnetic recording media comprising:

a. a flat circular disc, rotatable about a central circular opening during a recording operation in a recording apparatus, having top and bottom surfaces, one of which comprises a recording surface made up of a magnetic oxide coating on said disc; and b. an elongated orientation slot adjacent said circular opening and positioned at about 45° to a radius extending from said circular opening, and associated with said recording surface for 1) determining top and bottom orientation of said disc with respect to said recording apparatus, and 2) rotating a turntable means in said recording apparatus.

* * * * *